US006528568B2

(12) United States Patent
Kinniard et al.

(10) Patent No.: US 6,528,568 B2
(45) Date of Patent: Mar. 4, 2003

(54) METHOD FOR MANUFACTURING HIGH OPACITY, DURABLE PIGMENT

(75) Inventors: Stephen P. Kinniard, Ellicott City, MD (US); Anne Campeotto, Eaton, WA (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 35 days.

(21) Appl. No.: 09/792,457

(22) Filed: Feb. 23, 2001

(65) Prior Publication Data

US 2002/0165308 A1 Nov. 7, 2002

(51) Int. Cl.$^7$ .................................. C08K 3/18
(52) U.S. Cl. ..................................... 524/430
(58) Field of Search .......................... 524/430

(56) References Cited

U.S. PATENT DOCUMENTS

| 2,448,683 | A |   | 9/1948 | Peterson |         |
|-----------|---|---|--------|----------|---------|
| 3,876,442 | A | * | 4/1975 | Thomas   | 106/300 |
| 4,199,370 | A |   | 4/1980 | Brand    |         |
| 4,224,080 | A | * | 9/1980 | Chambers | 106/308 |
| 4,461,810 | A |   | 7/1984 | Jacobson |         |
| 4,540,441 | A | * | 9/1985 | Rado     | 106/300 |
| 4,927,464 | A |   | 5/1990 | Cowie    |         |
| 5,041,162 | A | * | 8/1991 | Brand    | 106/446 |
| 5,730,795 | A | * | 3/1998 | Herkimer | 106/446 |
| 5,753,025 | A | * | 5/1998 | Bettler  | 106/442 |
| 6,395,081 | B1| * | 5/2002 | Hiew     | 106/446 |

FOREIGN PATENT DOCUMENTS

| EP | 0 444 798 | 9/1991 |
| EP | 0 576 120 | 12/1993 |
| GB | 1 103 577 | 2/1968 |

* cited by examiner

Primary Examiner—Edward J. Cain
(74) Attorney, Agent, or Firm—Kalow & Springut LLP

(57) ABSTRACT

The present invention relates to an improved titanium dioxide pigment that incorporate a dense silica coating and its process for manufacture. The pigment is preferably produced from a titania base from the chloride process in which the manufacturing process comprises the following steps in the order stated: (a) partial or substantial removal of salt from the oxidizer discharge; (b) addition of a dispersant; (c) milling to produce a highly dispersed, highly deagglomerated slurry, followed by dense silica surface treatment. Pigments prepared using the inventive process exhibit optics equivalent to high gloss, high opacity pigments and maintain the durability of the more conventional dense silica treated pigments.

22 Claims, No Drawings

METHOD FOR MANUFACTURING HIGH OPACITY, DURABLE PIGMENT

BACKGROUND OF THE INVENTION

The present invention relates to methods for manufacture of titanium dioxide pigments that are encapsulated with a dense silica layer and have improved optical properties.

Titanium dioxide ("$TiO_2$") by virtue of its high refractive index and low reactivity has become the premier white pigment of commerce. However, titanium dioxide is also a photocatalyst that can contribute to the destruction of polymeric binders in polymers in which it is incorporated. Manufacturers of titanium dioxide pigments (also called "titania" pigments) have developed a number of surface treatments whereby inorganic and organic compounds are added to the raw titania base to both reduce the photocatalytic activity and improve the degree to which the pigment is dispersed. Typical inorganic surface treatments are usually precipitated from an aqueous solution as oxides or hydrated oxides of elements including titanium, aluminum, phosphorous, zirconium, tin and silicon, or mixtures thereof.

Of the options available, so far only silica treatments have been able to deliver maximum durability on a commercial level. More particularly, the silica is required to be precipitated in a dense form to optimize durability. Unfortunately, dense silica treatments have not been able to match the opacity obtainable with other inorganic surface treatments such as titania and zirconia. Since the primary role of titanium dioxide has been as an opacifier, the market has been split into two general classes of "durable" and "universal" or high opacity grades. Whilst there has been movement towards higher opacity dense silica treated grades over the last decade, opacity is usually improved by reducing the silica level from those typically established on the benchmark "superdurable" grades of titania.

Dense silica treatments of oxides, including titanium dioxide, are described in the prior art. Methods for improving dispersability or optics of dense silica treated pigment are also known, including for example, by the addition of a topcoat of alumina or by using combinations of dense and porous silica.

The use of a milling step after dense silica treatment and washing, but before drying, has been found to produce pigment having a good particle size distribution. The use of steric stabilizers such as alkali metal salts of organic fatty acids for silica treatments has been used to prepare non-agglomerated water insoluble particles having a dense amorphous silica coating. The use of ultrasonic vibrations for at least part of the dense silica precipitation has also been used to produce satisfactory coatings of dense silica on inorganic particles at a moderate temperature and at an acceptable rate. The use of monomeric precursors, such as tetraethylorthosilicate, to obtain a substantially uniform and homogenous dense silica coating has also been tried—with the expectation of reducing treatment levels and producing higher gloss.

While the above-mentioned processes attempt to overcome the compromise between gloss, optics and durability, none have developed a process which truly overcomes the problem and provides a high durable, dense silica coated pigment with good optics and gloss properties.

SUMMARY OF THE INVENTION

The invention relates to an improved titanium dioxide pigment that incorporate a dense silica coating and its process for manufacture. The pigment is preferably produced from a titania base from the chloride process in which the manufacturing process comprises the following steps in the order stated: (a) partial or substantial removal of salt from the oxidizer discharge; (b) addition of a dispersant; (c) milling to produce a highly dispersed, highly deagglomerated slurry, followed by dense silica surface treatment.

Pigments prepared using the inventive process exhibit optics equivalent to high gloss, high opacity pigments and maintain the durability of the more conventional dense silica treated pigments.

DETAILED DESCRIPTION OF THE INVENTION

Dense silica technology has been in existence for around four decades and has so far been unable to be applied successfully without some compromise to pigment properties, usually gloss and opacity. Experiments to better understand the cause of poor opacity when using dense silica treatments have identified the cause of poor opacity to include agglomeration or "gluing" of particles together upon addition of silicate to the $TiO_2$ slurry. The present invention sets forth a number of steps and their sequence to successfully coat titania pigments with dense silica coatings and which avoids agglomeration, and thus the detrimental effects on gloss and opacity.

Titanium dioxide is commercially manufactured by either the sulfate route or the chloride route. Of these two routes, the chloride route has established a clear dominance in terms of both economics and product performance. The vast majority of future capacity will be manufactured by the chloride route, indeed it is unlikely that any further sulfate route plants will be built in any of the major industrialized countries. The ability to manufacture pigments using dense silica technology with no compromise of either durability or optics on chloride process plants is one of the main foci of the titanium dioxide industry.

The chloride process, whereby titanium tetrachloride is reacted with oxygen in a high temperature reactor (the oxidation reaction), followed by rapid cooling in a length of pipe, sometimes referred to as a flue pipe, is well known and does not require a detailed explanation. However there are two steps which are critical to modem chloride plants and which have a significant impact upon the production of dense silica treated pigment using base prepared on these plants.

Virtually all industrial chloride pigment plants use aluminum as a key additive during oxidation, usually as aluminum chloride which is added with either the titanium tetrachloride or the oxygen. The aluminum chloride acts to promote formation of the rutile crystal and also produces a base that is less photoactive. Due to the conditions of reaction, the base is usually enriched in aluminum compounds at the surface. Although only typically 0.5–2% Al2O3 is added, expressed as weight percent with respect to $TiO_2$, most of this is at the surface and is reasonably hydrated particularly after contacting water after the oxidation step. The oxidizer discharge is usually mixed with water to form a slurry which is then processed in subsequent steps such as wet milling and surface treatment. The pH of the slurry is usually around 3.5–4 pH due to buffering from some of the aluminum. The "raw" base typically has an isoelectric point of around 7–8.

A second factor common to all oxidation processes is the need to rapidly quench the reaction as the product exits the reactor to avoid undesirable particle growth. This is commonly achieved by the product of the reaction entering an externally cooled flue pipe to rapidly cool the exiting gas stream and entrained titanium dioxide particles. To ensure good heat transfer a scouring agent is commonly added into the hot gaseous stream to remove any excessive buildup of pigment on the internal wall of the cooling flue pipe. Common scouring agents include sand, NaCl, KCl, CsCl and compacted particles of titanium dioxide. The prior art also teaches that a bimodal particle size distribution of scouring agent is particularly effective and that the use of salt has benefits over the use of sand—including reduced abrasion of the flue pipe and a significant reduction in pressure drop over the bag filter used to separate the titania particles from the chlorine.

Sand or compacted or calcined $TiO_2$ can be used for scouring of the flue pipe to maintain efficient heat transfer. In this case the salt content of the slurry will be lower, however sources of salt still remain. Residual chlorine and possibly unreacted aluminum chloride or even titanium tetrachloride will result in salt formation as the pH is lifted from the natural acidic pH of raw oxidizer discharge to the alkaline pH range under which dense silica treatments are performed. A base such as sodium hydroxide is used to raise the pH, resulting in in-situ formation of NaCl. The amount of salt generated in this way can be significant, with levels up to around 1% NaCl weight for weight (w/w) with respect to $TiO_2$.

Dense silica treatments are typically performed under alkaline conditions, the pH often being around 9–10 before silicate is added. Under these conditions it is unlikely that a highly dispersed slurry may be obtained due to the relatively high isoelectric point of the base. Addition of silicate to a slurry containing flocs results in formation of aluminum silicates which effectively glue the particles together. These aluminosilicate bonds are hard to break under conventional milling conditions such as fluid energy milling, or "micronizing". Subsequent coating with more silica, as the soluble silicate is deposited on the particle surface, produces a product that is particularly difficult to micronize.

It has been shown by measurement of particle size during treatment that addition of silicate to a slurry of oxidizer discharge results in agglomeration of the particles. To avoid this agglomeration, a highly dispersed slurry was prepared by (i) neutralizing and washing raw oxidizer discharge to substantially reduce the salt content; (ii) repulping the neutralized, washed discharge (also the base) with water containing a dispersant and (iii) milling the resulting admixture to produce a highly stable dispersed slurry. Addition of silicate to this slurry resulted in no agglomeration as measured by particle size, and resulted in a pigment after washing, drying and micronizing, with a particle size distribution equivalent to a pigment treated with titanyl sulphate and alumina, a typical general purpose treatment known to give excellent opacity.

The level of salt at which agglomeration occurs upon silicate addition is a function of the degree of flocculation of the slurry. Measurements of viscosity versus salt concentration on a slurry dispersed with 0.2% phosphate show a clear inflection point at around 7 grams per liter of NaCl. Above this concentration, the viscosity rises steadily due to higher degrees of flocculation. As such, an upper limit of 7 grams per liter NaCl exists to minimize flocculation. It is sometimes common to refer to the salt concentration as a percentage referenced to the $TiO_2$ concentration of the slurry. Hence, for a slurry with 300 grams per liter of $TiO_2$ (a typical surface treatment concentration), an NaCl concentration of 7 grams per liter equates to 2.2% NaCl w/w with respect to $TiO_2$. At 700 gpl $TiO_2$, this same concentration equates to only 0.8% NaCl w/w with respect to $TiO_2$. Hence, the higher the desired $TiO_2$ concentration, the lower the salt concentration needs to be when expressed as a percentage of the $TiO_2$ concentration to avoid exceeding the absolute concentration of 7 grams per liter (gpl) NaCl. Typically, the highest concentration of interest will be at the wet milling stage, where concentrations of around 1000 grams per liter of $TiO_2$ are practiced. To achieve a well dispersed slurry during this milling stage the NaCl concentration should not exceed 0.5% w/w on $TiO_2$. An allowance for the volume occupied by the $TiO_2$ particles should be made when calculating the quantity of salt.

During the surface treatment of the base, salt is introduced into the slurry in the form of treatment chemicals such as sodium silicate and acids such as HCl or $H_2SO_4$. These salts can induce flocculation in the same manner as salts present in the base from the oxidation step. Using a concentration of 7 gpl NaCl as a threshold, this equates to 3.74 gpl $Na_2O$. For a typical sodium silicate with a $SiO_2$:$Na_2O$ ratio of 3.2, this concentration corresponds to 12 gpl $SiO_2$. At a $TiO_2$ concentration of 300 gpl, this is equivalent to 4% $SiO_2$. That is, up to 4% $SiO_2$ can be added as sodium silicate to a slurry containing 300 gpl $TiO_2$ and remain below the 7 gpl NaCl threshold. Above this level some flocculation will eventually occur. This is in the circumstance when there is negligible NaCl present in the starting slurry prior to silicate addition. Any residual salt will have an additive effect and will reduce the quantity of $SiO_2$ which can be deposited whilst the particles are in a dispersed state. Even when salt is not used for scouring the flue pipe, salt generated by neutralization of residual chlorides when adjusting the pH from the natural acidic character of oxidizer discharge to the alkaline environment required for silica treatments can still be detrimental. For example, with 0.5% residual NaCl (w/w with respect to $TiO_2$), the maximum amount of $SiO_2$ which may be added before flocculation may occur is reduced to 2.8% assuming a $TiO_2$ concentration of 300 gpl. It is therefore desirable to operate with the lowest practical salt concentration prior to surface treatment to allow the maximum benefit of the reduced salt concentration to be obtained.

It is impractical to entirely remove all salt from the slurry or base as some residual ions will always be present. As stated above, it is desirable to operate with the lowest practical salt concentration prior to surface treatment. Accordingly, the present invention only requires removal of that portion of the salt that is commercially practical. It is contemplated that a substantial amount of the salt in the base will be removed, but the base will not be entirely salt-free. Benefits of the invention will be achieved if the base is substantially free of salt; that is, commercially practical steps are taken to remove a substantial amount of the salt. Preferably, a base in which sufficient water has been used to at least displace the theoretical volume of liquid contained in the filter cake will suffice. For example, a filter cake with a 50% solids content will contain 50 grams of liquid for every 50 grams of $TiO_2$. Washing this cake with sufficient water (in this case 50 grams) to displace the salty water will satisfy the "substantially salt free" requirement. The solids content of oxidizer discharge, when neutralized and dewatered will typically be 50–60% for vacuum filtration and greater than 60% for pressure filtration. In practice a slight excess over the theoretical displacement volume may be used to ensure consistent product quality. It is preferred to use deionized water for the washing.

It has been found, that changing the order of these three steps—(i) neutralizing and washing raw oxidizer discharge to substantially reduce the salt content; (ii) repulping the neutralized, washed discharge with water containing a dispersant and (iii) milling the resulting admixture to produce a highly stable dispersed slurry—results in a significantly different final product. Likewise, addition of a dispersant without reducing the salt content does not guarantee a highly dispersed slurry, even if followed by a wet milling step.

Ideally the sequence is to first remove soluble salt, preferably via filtration or dilution and settling since the oxidizer discharge is quite amenable to these processes. The preferred method is to neutralize and wash the oxidizer discharge using a filter. Any type of filter is suitable for the process. Typical examples would be rotary vacuum filters, pressure filters or membrane filters. The salt level is substantially reduced, by which is meant a level readily obtained by normal filtration practice whereby the salty water in the filter cake is substantially displaced by clean water, with at least a one to one wash ratio based upon the liquid contained within the filter cake.

The base with a substantially reduced salt content is then repulped with a dispersing agent. For the purposes of this disclosure, the term "dispersing agent" or "dispersant" includes dispersion stabilizers such as acids and other agents which permit or enhance "natural" dispersions. Any type of dispersing agent is suitable although common dispersants such as phosphates; citric acid and its salts such as sodium citrate; and amines are quite suitable. Mixtures of dispersing agents can also be used. Suitable dispersants, including those typically added to titanium dioxide slurries for sand milling and wet milling, are well known or readily determinable by those skilled in the industry. Some suitable dispersants are referenced in publications such as "*Titanium Its Occurrence, Chemistry and Technology*," by Jelks Barksdale, 2nd Ed., 1966, The Ronald Press Co. Other examples of dispersants for wet milling may be found in U.S. Pat. Nos. 4,052,223; 4,447,271; 5,203,916 and 5,730,796.

The amount of dispersing agent is not critical except that sufficient amount is added to produce a stable dispersion. The appropriate amount or level of dispersing agent can be readily obtained by tests such as dispersant demand testing using a plot of viscosity versus quantity of added dispersant. This test is well known in the pigment industry and will be familiar to those in the art.

It is possible to use an acid, such as hydrochloric acid, to operate as the dispersing agent. When the dispersing agent is an acid, it is preferable to add the source of silica, for example sodium silicate, directly to the acidic wet milled base instead of raising the pH prior to silicate addition. There is typically adequate alkalinity in the silicate solution to raise the pH to the alkaline environment favorable for dense silica surface treatment. Due to the alumina rich surface on the titania particles, the isoelectric point is sufficiently high that simply reducing the pH can increase the surface charge sufficiently to produce a stable dispersion. Surprisingly it has been found that even though the slurry passes through a point of zero charge upon addition of silicate solution (acidic stabilized dispersions have a positive charge whereas the alkaline conditions required for silica treatments results in particles with a negative charge) agglomeration is substantially reduced compared to conventional treatments.

Preferably the slurry with dispersing agent added will be an alkaline slurry, typically a pH in the range of about 7–10. This ensures that the slurry will remain above the isoelectric point prior to any silicate addition and is the most stable condition.

The third step is to mill the slurry. Milling is preferably performed to the extent necessary to achieve a highly dispersed slurry. A media mill such as a sand mill or horizontal media mill is preferred. These milling processes are familiar to those in the art as well as other suitable milling processes. One of the benefits derived from washing out soluble salts is that substantially higher solids concentrations can be obtained for the same viscosity and results in increased throughput at the wet milling stage. The milling step is used to both break down oversize aggregates and to disperse the titanium dioxide. As silicate will coat any agglomerates with a dense silica shell it is desirable to generate a slurry in the wet mill with a low level of coarse particles. Operating at higher solids contents allows for increased residence times for a given throughput and is thus beneficial to a high degree of milling being achieved.

The product obtained after the wet milling step consists of a highly dispersed slurry which is stable to addition of silicate and does not agglomerate with up to 5% added silicate (expressed as % SiO2 with respect to $TiO_2$) and shows only modest agglomeration at levels up to at least 15% silicate. Surprisingly, even when silicate solution (which is also a source of salt) is added to the highly dispersed slurry in an amount to increase the conductivity to levels similar to slurry which has not been washed, agglomeration is much reduced.

The use of the highly dispersed slurry of the process described for dense silica treated pigment has other benefits as well. After completing the surface treatment, pigment is washed to remove soluble salts and dried prior to micronizing to produce the final $TiO_2$ product. The agglomeration that normally occurs upon addition of soluble silicate to a slurry containing flocculated particles results in a filter cake that has a network type structure which has a high water content. Addition of silicate to a highly dispersed slurry does not form this network structure and subsequently the solids content of the pigment after surface treatment and washing is substantially higher. This reduces energy required for drying and can lead to significant throughput benefits where drying is a process bottleneck.

The dense silica surface treatment may be either batch or continuous, and is not particularly critical so long as the treatment conditions are capable of producing a dense silica encapsulation of the pigment particles. Both the "all-in" and "co-addition" methods are suitable. In the "all-in" method, all of the silicate (sodium or potassium silicates being common examples) is added to the slurry followed by neutralization with an acid, such as hydrochloric or sulfuric acid. In the "co-addition" method, silicate and acid are added simultaneously to maintain a target pH for silica deposition. Co-addition of silicate and acid has an advantage in that for any given level of silica, the ionic strength during the treatment is minimized. This allows a higher level of silica to be deposited before agglomeration occurs due to the salt formed in-situ by the surface treatment chemicals themselves. Co-addition of silicate however does present problems when practiced, particularly in an industrial environment. The main problem is that the pH probe itself becomes coated with a layer of dense silica and can quickly become inaccurate. As control of pH is a critical step in a co-addition treatment, this can lead to poor control of treatments and is also a source of high maintenance. Batch treatments can largely overcome these weaknesses as measurement of pH is not required during much of the silicate neutralization as long as the acid flow is well controlled.

It has been found that the benefits of both the all-in and co-addition methods of silicate treatment can be obtained with a split silica treatment. In this process a fraction of the silicate is added to the highly dispersed slurry and acid is then added to coat this silica onto the particles by lowering the pH to a level whereby the silica is substantially precipitated. A pH less than about 10 is desirable, although care must be taken not to go too low or agglomeration of particles may result. Typically the pH should be greater than about 7 after the acid has been added. The remainder of the silicate is added to the slurry and neutralization with acid in the conventional manner. It has been found that by first coating a portion of the silica onto the surface of the pigment particles the slurry is more tolerant to addition of further silicate and resists agglomeration.

The amount added in each step depends upon the total silica level targeted. At levels less than about 3% silica, there is no benefit to be derived from splitting the silica addition into two steps as no significant agglomeration occurs in a single step all-in silicate treatment. At total levels greater than about 3%, an initial silicate level of around 2% has been found to be satisfactory. If particularly high levels of silica are required it may be beneficial to split the silica addition into 3 or more steps.

Dense silica treatments are performed either by the batch or the continuous method. In the batch treatment, the $TiO_2$ base is loaded into a vessel and the reagents added in the desired sequence with the treated product discharged at the completion of the treatment. In the continuous treatment, a continuous flow of $TiO_2$ base is maintained through a group of vessels connected in series with reagents added in the desired sequence to the vessels, with a continuous discharge of treated product from the final vessel. Alternatively a long pipe or tube may be used through which the $TiO_2$ base is passed with reagents added at different points along the pipe.

It is not critical whether the batch or continuous method is used for the dense silica treatment, so long as a base prepared by removal of salt, dispersion and wet milling is used as the starting material for the treatment. It is desirable to have good agitation to ensure rapid mixing of the treatment chemicals, particularly the acid used to neutralize the silicate. This avoids zones of high acid concentration and poor, uncontrolled silica precipitation. A slurry with a low viscosity is highly beneficial. The base prepared by removal of salt, dispersion and wet milling has a low viscosity. Additionally, by avoiding formation of a network structure upon silicate addition and remaining dispersed as discrete particles the viscosity remains low and ensures excellent mixing for controlled silicate deposition. It may be possible to utilize the low slurry viscosity by treating at a higher solids concentration. This can be beneficial by either increasing throughput for either a given cycle time in batch treatments or a given flow rate in continuous treatments. Alternatively the higher solids concentration may be utilized to increase the silica deposition or cure time to ensure optimum encapsulation.

Particle size measurements were performed using an in-house technique which measures absorbance of a dilute suspension of particles at a number of wavelengths and calculates the mean and standard deviation assuming a log-normal particle size distribution based on Mie theory of light scattering. The test method has a mean upper limit of 0.45 microns, however for the purpose of this work this was not a limitation as the desired particle size is around 0.3 microns.

Photocatalytic activity is measured using the established reaction whereby isopropanol is oxidized to acetone in the presence of $TiO_2$ and a UV source. A continuously stirred mixture of 4 grams of pigment in 20 mls of isopropanol is exposed to a UV lamp for 2 hours. The resultant solution is centrifuged and a sample of the supernatent analysed by gas chromatograph for acetone. The more photocatalytic the pigment (i.e., the poorer the durability) the higher the concentration of acetone after exposure.

Tinting strength is measured by compounding 100 parts by weight flexible polyvinyl chloride containing carbon black with 4 parts by weight of pigment on a two-roll mill. The gray mat which is produced is pressed out on a heat press to prepare a smooth flat surface for color measurement. The L* and b* values are read on a Hunterlab color meter. A high L* value is indicative of a high opacity and a more negative b* value is indicative of a smaller particle size or reduced degree of agglomeration.

The following examples set forth preferred embodiments of the invention. These embodiments are merely illustrative and are not intended to, and should not be construed to, limit the claimed invention in any way.

COMPARATIVE EXAMPLE 1

Oxidizer discharge which had been slurried with water to a concentration of approximately 650 grams per liter and dosed with hydrogen peroxide to react with residual chlorine gas was sand milled to reduce the coarse fraction. This slurry was screened and heated to 85 degrees C. at a concentration of 300 grams per liter (gpl). The pH was adjusted to 9.5 with NaOH followed by sodium silicate solution added in sufficient quantity to achieve 2.8% SiO2 with respect to the $TiO_2$. Samples were taken of the heated slurry immediately before and after the silicate addition and measured for particle size (microns).

| Before Silicate | After Silicate |
| --- | --- |
| 0.296 | >0.45 |

It is seen that upon addition of silicate the particle size is significantly larger.

EXAMPLE 1

Oxidizer discharge was slurried with water after peroxide treatment and adjusted to 600 gpl. The slurry was neutralized to a pH of 7–7.5 with 200 gpl NaOH solution and heated to 60–70 C. This neutralized base was dewatered on a vacuum filter and washed with 1.5 grams of hot demineralized water for every gram of $TiO_2$ present in the slurry. This washed slurry, which was substantially salt free was repulped with sodium hexametaphosphate equivalent to 0.2% expressed as P2O5 with respect to $TiO_2$ and adjusted to 600 gpl. This slurry was wet milled to produce a highly dispersed slurry of titania. The slurry pH was around 8 after wet milling. The slurry was diluted to 300 gpl and screened to separate from the milling media. The pH of the slurry was adjusted to pH 9 followed by heating to 85 C. Sodium silicate solution was added in increments equivalent to 1% SiO2 with respect to $TiO_2$ and samples taken for particle size after each addition. The measured sizes are tabled below.

| Increment | Mean Size (microns) |
|---|---|
| Before silicate (blank) | 0.276 |
| 1% SiO2 | 0.280 |
| 2% SiO2 | 0.280 |
| 3% SiO2 | 0.280 |
| 4% SiO2 | 0.280 |
| 5% SiO2 | 0.280 |
| 6% SiO2 | 0.292 |
| 7% SiO2 | 0.294 |
| 8% SiO2 | 0.298 |
| 9% SiO2 | 0.302 |
| 10% SiO2 | 0.304 |
| 11% SiO2 | 0.306 |
| 12% SiO2 | 0.310 |
| 13% SiO2 | 0.314 |
| 14% SiO2 | 0.314 |
| 15% SiO2 | 0.316 |

It is seen that using base which has been washed, dispersant added and wet milled, even with the volume of silicate equivalent to 15% SiO2, agglomeration is substantially reduced compared to comparative example 1 where gross agglomeration occurred with only 2.8% silica equivalent.

EXAMPLE 2

Oxidizer discharge was slurried with water after peroxide treatment and adjusted to 300 gpl. The slurry was heated to 70 C. and neutralized to a pH of between 7 and 7.5 with 200 gpl NaOH solution. This neutralized base was dewatered on a vacuum filter and washed with 1.5 grams of hot demineralized water for every gram of $TiO_2$ present in the slurry. This washed slurry, which was substantially salt free was repulped with sodium hexametaphosphate equivalent to 0.2% expressed as $P_2O_5$ with respect to $TiO_2$ and adjusted to 600 gpl. This slurry was wet milled to produce a highly dispersed slurry of titania. The slurry pH was around 8 after wet milling. The slurry was diluted to 300 gpl and screened to separate the milling media. The slurry was heated to 85 C. No further pH adjustment was made prior to the silicate addition. Sodium silicate was added in sufficient quantity to achieve 2.7% SiO2 with respect to the $TiO_2$. As with comparative example 1, samples were taken before and after silicate addition and measured for particle size.

| Before Silicate | After Silicate |
|---|---|
| 0.274 | 0.276 |

Again it is seen that the base which had been neutralized, washed, dispersed and sand milled was very stable to addition of silicate.

After addition of sodium silicate the silica was precipitated onto the titania particles by slowly adding HCl over about 1 hour. Samples were taken throughout the neutralization until a pH of about 8 was reached. No further particle size testing is done below pH 8 as the samples tend to flocculate at lower pH's. A total of 80 mls of HCl were required to lower the pH to 8. Particle size was measured every 10 mls.

| Mls HCl | 10 | 20 | 30 | 40 | 50 | 60 | 70 | 80 |
|---|---|---|---|---|---|---|---|---|
| Mean Size | 0.276 | 0.278 | 0.278 | 0.278 | 0.278 | 0.280 | 0.280 | 0.282 |

It is seen that there is negligible growth in particle size throughout the silica precipitation. Each particle was coated with a dense silica shell while remaining highly dispersed.

EXAMPLE 3

Oxidizer discharge was neutralized, washed, dispersed and wet milled as in example 2. This base was adjusted to 300 gpl and heated to 85C. Potassium silicate was added in sufficient quantity to achieve 4.5% SiO2 with respect to $TiO_2$. HCl was added slowly over about 1 hour to precipitate the silica onto the titania particles. The particle size was measured throughout the treatment until a pH of 8 was reached during the HCl addition step. The table below has the particle sizes as measured.

| Step | Before silicate | After silicate | 1/5th HCl | 2/5th HCl | 3/5th HCl | 4/5th HCl | 5/5th HCl |
|---|---|---|---|---|---|---|---|
| Mean Size | 0.278 | 0.280 | 0.292 | 0.368 | 0.418 | >0.45 | >0.45 |

It is seen that the particle size is not particularly affected by addition of the silicate solution, however significant growth is seen after about two fifths of the acid has been added.

EXAMPLE 4

Oxidizer discharge was neutralized, washed, dispersed and wet milled as in example 2. The base was adjusted to 300 gpl and heated to 85C. Sodium silicate was added in sufficient quantity to achieve 4.5% SiO2 with respect to $TiO_2$. In this case, the silicate was added in two equal amounts, with HCl added to precipitate the first portion before the second portion of silicate was added. Particle sizes throughout the treatment are shown below.

| Step | Mean Size |
|---|---|
| Milled base before silicate | 0.278 |
| After 2.25% SiO2 | 0.280 |
| After HCl to pH 9 | 0.280 |
| After 2nd 2.25% SiO2 | 0.282 |
| After 1/6th HCl added | 0.284 |
| After 2/6th HCl added | 0.288 |
| After 3/6th HCl added | 0.296 |
| After 4/6th HCl added | 0.298 |
| After 5/6th HCl added | 0.312 |
| After 6/6th HCl added | 0.322 |

It is seen compared to example 3 that much less agglomeration has occurred using the 2-stage silica precipitation step versus adding the full volume of silicate at the start of the treatment. Indeed there is negligible agglomeration after the first 2.25% silica was precipitated by adjusting to pH 9 with HCl, which is to be expected from the results of example 2, whereby 2.7% SiO2 was precipitated with negligible agglomeration.

COMPARATIVE EXAMPLE 2

A quantity of oxidizer discharge was treated by addition of sodium hexametaphosphate equivalent to 0.2% $P_2O_5$ with respect to $TiO_2$ and NaOH solution added to achieve a pH of 9.5. This base was not washed to remove salt before wet milling. The slurry was milled using the same milling conditions as the previous samples. The milled slurry was separated from the milling media, diluted to 300 gpl and heated to 85C. To this slurry was added sufficient sodium silicate to achieve 2.7% SiO2 with respect to $TiO_2$. The particle size was measured immediately before and after the silicate.

| Before Silicate | After Silicate |
|---|---|
| 0.322 | >0.45 |

It is seen that addition of dispersant and wet milling without washing did not avoid agglomeration upon addition of the silicate. Due to the salt present from the oxidation step the slurry was in fact less millable using the alkaline phosphate conditions than the base milled on the acid side without phosphate dispersant (comparative example 1).

COMPARATIVE EXAMPLE 3

A sample of base which had been wet milled using conditions as in comparative example 1 was neutralized and washed to remove soluble salt. This base was repulped with sodium hexametaphosphate equivalent to 0.2% P2O5 with respect to $TiO_2$ and adjusted to 300 gpl $TiO_2$. This base was then heated to 85C. and 2.7% SiO2 added as sodium silicate. HCl was then added slowly over about 1 hour. Samples were taken for particle size throughout the treatment until a pH of 8 was reached during the HCl addition step. The results are tabled below.

| Step | Mean Size |
|---|---|
| Initial base after wet milling | 0.286 |
| Base after washing and repulping with phosphate | 0.344 |
| After 2.7% SiO2 | 0.398 |
| After 1/8$^{th}$ HCl | 0.398 |
| After 2/8$^{th}$ HCl | 0.406 |
| After 3/8$^{th}$ HCl | 0.398 |
| After 4/8$^{th}$ HCl | 0.394 |
| After 5/8$^{th}$ HCl | 0.408 |
| After 6/8$^{th}$ HCl | 0.412 |
| After 7/8$^{th}$ HCl | 0.410 |
| After 8/8$^{th}$ HCl | 0.422 |

It is seen that by changing the sequence from Wash/Disperse/Sandmill to Sandmill/Wash/Disperse significant agglomeration still can occur, even though the base is low in salt. Wet milling should be the final step to maximise the degree of dispersion prior to silicate addition.

COMPARATIVE EXAMPLE 4

Oxidizer discharge which had been wet milled as in comparative example 1 was treated in an equivalent manner to comparative example 1 except sufficient sodium silicate was added to achieve a 4.5% SiO2 target with respect to $TiO_2$. In this case as with the other cases whereby dense silica was precipitated, the treatment was finished in the following manner. After the silicate solution was added, HCl was added over approximately 1 hour to achieve a target pH of 4–5 (particle size sampling ceased when the pH reached 8). Sodium aluminate was then added concurrently with HCl to maintain a target pH of 5–6. Sufficient sodium aluminate was added to achieve 2% Al2O3 with respect to $TiO_2$. The pH was adjusted to 6, aged for 15–20 minutes and readjusted to pH 6 and then filter washed to remove soluble salt. Approximately 3.3 grams of hot demineralized water were used per gram of $TiO_2$ for washing. The washed base was then dried at approximately 110C. All samples were then sprayed with a solution of trimethylol propane (TMP) while mixing in a rotating drum to achieve approximately 0.3–0.4% TMP. The sample was then micronised in a fluid energy mill to generate the final sample of titanium dioxide pigment. All samples were micronized under identical conditions.

COMPARATIVE EXAMPLE 5

Oxidizer discharge which had been wet milled as in comparative example 1 was treated with 0.18% phosphate, 1% $TiO_2$ using titanyl sulphate and 2.7% Al2O3. This pigment was washed, dried, dosed with TMP and micronized. This pigment is representative of an excellent universal grade of high opacity.

EXAMPLE 5

The same procedure was used as in example 4 except the phosphate dispersant was replaced by monoisopropanolamine at a 1% addition level.

EXAMPLE 6

The same procedure was used as in example 4 except the phosphate dispersant was replaced with citric acid using 0.2% citric acid with respect to $TiO_2$. The pH was adjusted to 9.5 with NaOH after the washed base and citric acid were repulped together prior to wet milling.

The finished pigments after micronising were tested for particle size distribution (mean and standard deviation) and acetone generation. Pigments with a reduced mean and standard deviation are more optically efficient. High means and standard deviations are indicative of agglomerate formation during treatment. Acetone is generated by the photocatalytic surface of the rutile crystal when mixed with isopropanol and irradiated with ultra violet radiation. A low acetone concentration is indicative of a pigment with a high durability rating. The table below lists the pigments tested and their results in these tests.

| Pigment | Mean | Std Deviation | Acetone (ppm) |
|---|---|---|---|
| Comparative Example 4 | 0.320 | 1.526 | 3.3 |
| Comparative Example 1 | 0.296 | 1.484 | 7.9 |
| Comparative Example 5 | 0.268 | 1.408 | 16.3 |
| Example 2 | 0.266 | 1.402 | 2.9 |
| Comparative Example 2 | 0.288 | 1.436 | 5.2 |
| Comparative Example 3 | 0.284 | 1.444 | 4.0 |
| Example 3 | 0.272 | 1.406 | 3.7 |
| Example 4 | 0.270 | 1.400 | 2.2 |
| Example 5 | 0.270 | 1.398 | 2.9 |
| Example 6 | 0.268 | 1.396 | 2.6 |

The results show that standard treatments using base which has not had salt removed, followed by addition of dispersant and wet milling (comparative examples 1 and 4), when treated with dense silica shows a substantially poorer particle size distribution than comparative example 5, the non-silica treated, high opacity pigment. The examples prepared using base which had been washed to remove salt, repulped with a dispersant and wet milled (examples 2–6) have particle size distributions equivalent or better than the non-silica treated high opacity pigment and generate lower levels of acetone than the standard silica treated pigments.

Elimination of the washing step (comparative example 2) or washing after wet milling (comparative example 3), whilst an improvement over standard treatments does not achieve the same combination of excellent particle size distribution and low acetone generation as the samples prepared using the base which has been washed, followed by dispersion and finally wet milled prior to surface treatment.

EXAMPLE 7

Oxidizer discharge was neutralized, washed, dispersed and wet milled as in example 2. The $TiO_2$ concentration was adjusted to 330 gpl, heated to 80C. and a 1.25% SiO2 coating applied by slow neutralization with HCl, followed by 2% alumina. The treated pigment was washed, dried and micronised with 0.8% Sylvacote K from Arizona Chemical Corporation.

COMPARATIVE EXAMPLE 6

Oxidizer discharge was wet milled in the same manner as comparative example 1. The milled slurry was adjusted to a $TiO_2$ concentration of 312 gpl, heated to 80C. and a 1.25% SiO2 coating applied by slow neutralization with HCl followed by 2% alumina. The treated pigment was washed, dried and micronised with 0.8% Sylvacote K.

Tinting strength in flexible polyvinyl chloride was determined by mixing $TiO_2$ and PVC containing carbon black to achieve a $TiO_2$ concentration of 4% on a two roll mill. The resultant gray mat is pressed out and the L* and b* values measured. A higher L* value is indicative of a higher tinting strength and better opacity. A 4% change in $TiO_2$ content has been determined to cause a 1% change in L*. A more negative b* value is indicative of a smaller particle size and is a good guide to the underlying degree of agglomeration. The table below lists the results on a number of samples tested.

| Sample | L* Value | Delta b* Value | % L* | Efficiency |
|---|---|---|---|---|
| Comparative Example 4 | 51.23 | +0.19 | 97.1 | −11.6% |
| Comparative Example 1 | 52.25 | −0.13 | 99.0 | −4.0% |
| Example 2 | 53.70 | −0.77 | 101.8 | +7.2% |
| Example 6 | 53.56 | −0.69 | 101.5 | +6.0% |
| Example 7 | 53.45 | −0.34 | 101.3 | +5.2% |
| Comparative Example 6 | 52.76 | 0 | 100.0* | |

*Arbitrary standard

The pigments prepared using the washed, dispersed and wet milled base all exhibit superior tinting strength over the standard treatments and are significantly more negative in b* value. Interestingly the tinting strength is much less affected by silica level using the washed base than the standard treatments. Increasing silica to improve durability does not lead to the traditional loss of optics when using base which has been washed, dispersed and wet milled.

Upon reading the present disclosure, including the above examples, alternative constructions and embodiments will become obvious to those skilled in the art. These variations are considered to be fully within the scope and spirit of the invention. The subject invention is only limited by the claims which follow and their equivalents.

What is claimed is:

1. A process for treating titanium dioxide which comprises the following steps in the order stated: (a) reducing salt content of the titanium dioxide; (b) forming a dispersion comprising the titanium dioxide; (c) milling the dispersion; and (d) surface treating the titanium dioxide with an inorganic or organic compound.

2. A process of claim 1, wherein the titanium dioxide is obtained from an oxidizer of a chloride process for production of titanium dioxide.

3. A process of claim 1, wherein the salt content is reduced by filtration.

4. A process of claim 1, wherein the salt content is reduced by washing.

5. A process of claim 4, wherein the titanium dioxide is present with water in a filter cake prior to washing and a volume of wash water is used in the washing step that is equal to or greater than the volume of water present in the filter cake.

6. A process of claim 3, wherein the titanium dioxide is present in a slurry prior to filtration and the slurry is adjusted to a pH between about 5 and about 9.

7. A process of claim 6, wherein said slurry is filtered and washed until the salt content is reduced to a value less than about 2.2% by weight expressed as NaCl with respect to the $TiO_2$ concentration, or the molar equivalent for salts other than NaCl.

8. A process of claim 6, wherein said slurry is filtered and washed until the salt content is reduced to a value less than about 0.5% by weight expressed as NaCl with respect to the $TiO_2$ concentration, or the molar equivalent for salts other than NaCl.

9. A process of claim 1, wherein the dispersion is formed with a dispersing agent.

10. A process of claim 9, wherein the dispersing agent is a charge stabilizing agent.

11. A process of claim 9, wherein the dispersing agent is a phosphate, an amine, a salt of citric acid, or a polyacrylate.

12. A process of claim 9, wherein the dispersing agent is an acid.

13. A process of claim 12, wherein the dispersing agent is hydrochloric acid.

14. A process of claim 1, wherein the milling is effected by wet milling in a vertical or horizontal media mill.

15. A process of claim 1, wherein the surface treating is effected in a batch or continuous operation.

16. A process of claim 1, wherein the surface treating comprises treatment with silica.

17. A process of claim 16, wherein a dense silica coating is formed on the titanium dioxide.

18. A process of claim 17, wherein the dense silica coating is applied in two or more stages, each stage comprising adding a source of silica to the titanium dioxide followed by neutralization with an acid.

19. A process of claim 16, wherein the dispersion is formed with an acidic dispersing agent and the dispersion formed is an acidic dispersion and wherein the treatment with silica comprises addition of a silica source to the acidic dispersion after milling.

20. A method of improving gloss properties of silica-coated titanium dioxide pigment comprising the steps of: (a) forming an admixture containing titanium dioxide; (b) reducing salt content of the admixture; (c) adding a dispersing agent to the admixture; (d) milling the admixture; (e) coating the titanium dioxide in the admixture with silica; and (f) recovering titanium dioxide pigment from the admixture.

21. In the method of treating titanium dioxide with silica, the improvement being removal of salt, followed by addition of a dispersing agent, followed by wet milling, prior to treatment with silica.

22. A process for treating titanium dioxide that comprises the following steps in the order stated: (a) reducing salt content of the titanium dioxide; (b) forming a dispersion comprising the titanium dioxide; (c) milling the dispersion; (d) surface treating the titanium dioxide with an inorganic or organic compound to form a surface treated titanium dioxide; and (e) washing the surface treated titanium dioxide.

* * * * *